United States Patent
Hardt

(10) Patent No.: US 10,291,671 B2
(45) Date of Patent: May 14, 2019

(54) PACKET PRIORITIZATION BASED ON PACKET TIME STAMP INFORMATION

(71) Applicant: ARRIS Enterprises LLC, Suwanee, GA (US)

(72) Inventor: Charles Hardt, Lawrenceville, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 248 days.

(21) Appl. No.: 15/278,224

(22) Filed: Sep. 28, 2016

(65) Prior Publication Data

US 2018/0091570 A1 Mar. 29, 2018

(51) Int. Cl.
| | |
|---|---|
| H04L 29/08 | (2006.01) |
| H04L 29/06 | (2006.01) |
| H04L 12/26 | (2006.01) |
| H04L 12/833 | (2013.01) |
| H04L 12/875 | (2013.01) |
| H04L 12/853 | (2013.01) |

(52) U.S. Cl.
CPC ........ *H04L 65/4084* (2013.01); *H04L 43/106* (2013.01); *H04L 43/16* (2013.01); *H04L 47/2416* (2013.01); *H04L 47/2458* (2013.01); *H04L 47/564* (2013.01); *H04L 47/566* (2013.01); *H04L 65/80* (2013.01)

(58) Field of Classification Search
CPC .................................................... H04L 43/106
See application file for complete search history.

(56) References Cited

U.S. PATENT DOCUMENTS

| | | | |
|---|---|---|---|
| 6,760,309 B1 | 7/2004 | Rochberger et al. | |
| 2005/0007452 A1* | 1/2005 | McKay, III | .............. G06K 9/36 348/143 |
| 2008/0273533 A1* | 11/2008 | Deshpande | ........... H04L 47/564 370/392 |

FOREIGN PATENT DOCUMENTS

| | | |
|---|---|---|
| EP | 2882120 A1 | 6/2015 |
| WO | 2008/016848 A2 | 2/2005 |
| WO | 2006/069219 A2 | 6/2006 |

OTHER PUBLICATIONS

PCT International Search Report & Written Opinion, RE: Application No. PCT/US2017/043731, dated Oct. 16, 2017.

* cited by examiner

*Primary Examiner* — Adnan M Mirza
(74) *Attorney, Agent, or Firm* — Bart A. Perkins

(57) ABSTRACT

Methods, systems, and computer readable media can be operable to facilitate dynamic packet prioritization for delivery of multiple media streams based upon packet time stamp information. A central device may retrieve time stamp information associated with one or more packets of a media stream and system time clock information associated with a client device to which output of the media stream is targeted. The central device may compare the time stamp information to the system time clock information, and if the difference between the time stamp information and the system time clock information is less than a predetermined threshold, the central device may deviate from a default packet transmission scheme and may prioritize the delivery of packets from the media stream to the targeted client device.

20 Claims, 7 Drawing Sheets

PACKET PRIORITIZATION BASED ON PACKET TIME STAMP INFORMATION

TECHNICAL FIELD

This disclosure relates to the prioritization of packet delivery to client devices based on packet time stamp information.

BACKGROUND

Local networks servicing a premise may provide for delivery of multimedia content over various mediums, such as one or more wireless channels. Multimedia content delivered over a wireless network can be particularly vulnerable to problems arising in the transmission of the content to a client device and in the processing of the content at the client device. For example, where multiple premises or devices are sharing the same wireless channel, one or more pieces of multimedia content may be streamed to a plurality of client devices at one time, and it is possible that network congestion can cause macro blocking or total audio/video delivery failure where packets are consumed by a device at a faster rate than the rate at which packets are received by the device.

Typically, one or more buffers are used at a client device to account for the non-deterministic rate at which packets are delivered to a client device from an access point or central device providing a wireless network. The one or more buffers can temporarily store packets as they are received from an access point, and the client device can read packets from the one or more buffers for decoding and output. The rate at which a buffer is filled may depend on a number of factors including the bandwidth available to a client device. It should be understood that buffer depth (i.e., size) may be different from one client device to the next.

Bandwidth allocated to a client device may depend on various factors, such as congestion of an associated wireless network, and an underflow condition may arise if the one or more buffers at a client device receive packets at a lower bit rate than the bit rate at which packets are read from the one or more buffers. For example, if a decoder is reading packets from a buffer at a faster rate than the rate at which packets are written into the buffer, the situation may arise where the buffer is emptied and the decoder has no packet to read from the buffer. An underflow condition can result in a stalled or fragmented picture in the output of the associated multimedia content. The rate at which packets are consumed by a client device may vary according to a number of factors including the type or quality of content received at the device (e.g., high-definition channels require more bandwidth than standard-definition channels).

Typically, a central device transmits packets evenly or at a common bitrate or quality of service to each of a plurality of client devices, and packet streams output to each of the plurality of client devices may be given the same priority level. However, client devices do not generally consume received packets at a constant or common bitrate, and one or more client devices within a group of client devices that are served by a common central device can become underserved or encounter an underflow event while other client devices within the group maintain a full or nearly full buffer. For example, a client device receiving a weak wireless signal from an access point may consume more airtime in receiving a given amount of data than client devices receiving a stronger wireless signal from the access point. Thus, the central device is unable to account for discrepancies in the quality of content delivery to multiple client devices sharing a quality of service (QoS) level. Therefore, a need exists for improving methods and systems for prioritizing packet delivery for one or more of a plurality of media streams.

BRIEF DESCRIPTION OF THE DRAWINGS

Like reference numbers and designations in the various drawings indicate like elements.

DETAILED DESCRIPTION

Figure 1:
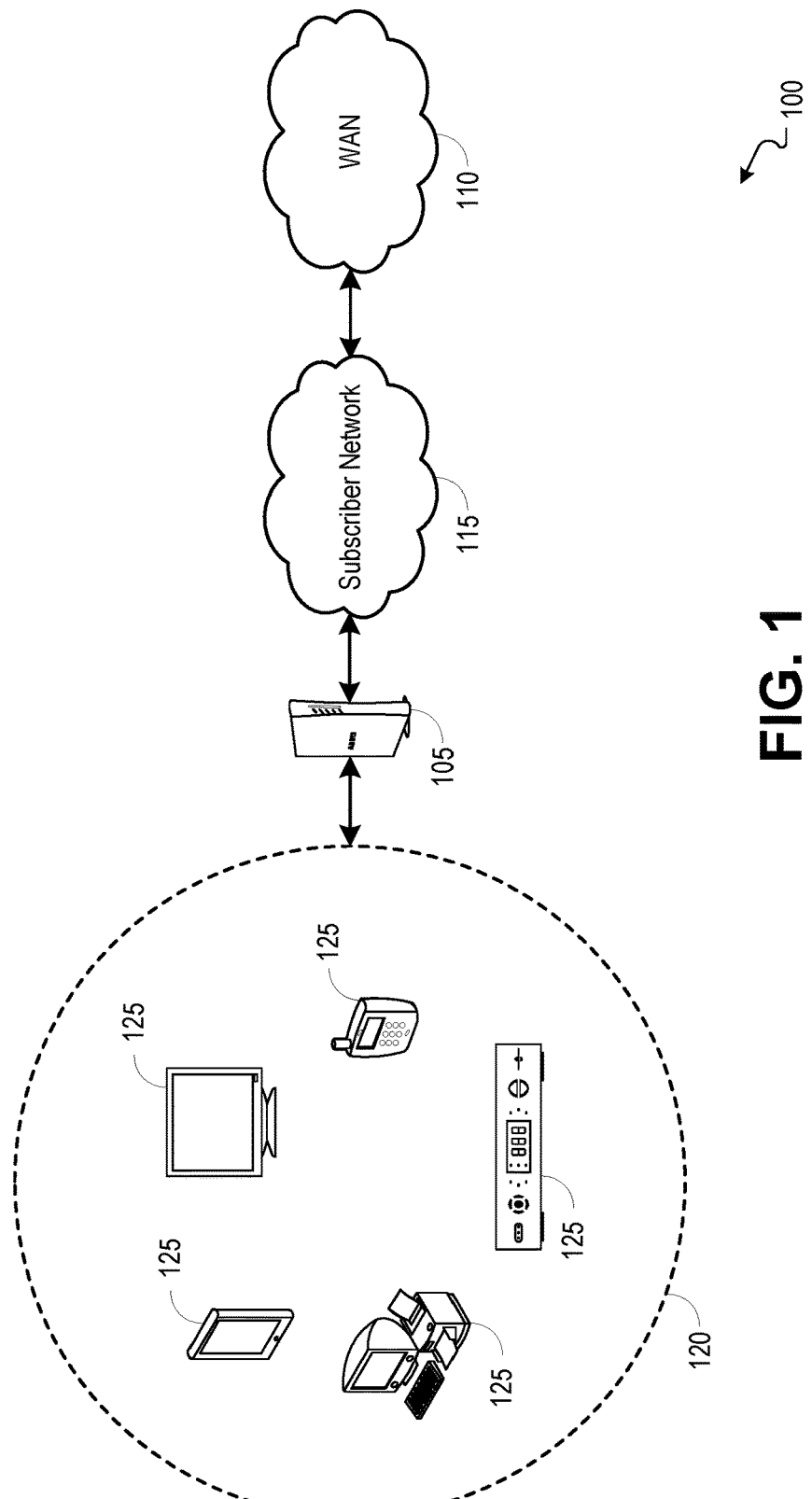
FIG. 1 is a block diagram illustrating an example network environment operable to facilitate dynamic packet prioritization for delivery of multiple media streams based upon packet time stamp information.

It is desirable to improve upon methods and systems for prioritizing packet delivery for one or more of a plurality of media streams. Methods, systems, and computer readable media can be operable to facilitate dynamic packet prioritization for delivery of multiple media streams based upon packet time stamp information. A central device may retrieve time stamp information associated with one or more packets of a media stream and system time clock information associated with a client device to which output of the media stream is targeted. The central device may compare the time stamp information to the system time clock information, and if the difference between the time stamp information and the system time clock information is less than a predetermined threshold, the central device may deviate from a default packet transmission scheme and may prioritize the delivery of packets from the media stream to the targeted client device.

An embodiment of the invention described herein may include a method comprising: (a) retrieving a time stamp value associated with a content segment of a media stream, wherein the media stream comprises one media stream of a plurality of media streams that are to be output from a central device to one or more media players; (b) identifying a target media player associated with the media stream which is associated with the retrieved time stamp value; (c)

retrieving a current system time value associated with the target media player; (d) comparing the retrieved time stamp value to the identified current system time value; and (e) if the retrieved time stamp value is greater than the identified current system time value by less than a predetermined threshold, prioritizing the delivery of the content segment to the associated media player over the delivery of one or more content segments associated with the one or more other media streams of the plurality of media streams.

According to an embodiment of the invention, the method described herein may further comprise, if the identified current system time value is less than the retrieved time stamp value by more than the predetermined threshold, delivering content segments of the plurality of media streams to the one or more media players using a default transmission scheduling scheme.

According to an embodiment of the invention, the method described herein may further comprise, if the retrieved time stamp value is less than the identified current system time value, discarding the content segment without outputting the content segment to the target media player.

According to an embodiment of the invention, prioritizing the delivery of the content segment to the associated media player over the delivery of one or more content segments associated with the one or more other media streams of the plurality of media streams comprises deviating from a default transmission scheduling scheme by placing the content segment into an output queue ahead of the one or more content segments associated with the one or more other media streams.

According to an embodiment of the invention, prioritizing the delivery of the content segment to the associated media player over the delivery of one or more content segments associated with the one or more other media streams of the plurality of media streams comprises outputting the content segment and one or more other content segments associated with the media stream at a higher rate than the rate at which the one or more content segments associated with the one or more other media streams are output.

According to an embodiment of the invention, the current system time value comprises a system time clock value and is retrieved by the central device from a program clock reference packet.

According to an embodiment of the invention, the time stamp value comprises a presentation time stamp value.

An embodiment of the invention described herein may include an apparatus comprising: (a) a wireless interface configured to be used to output one or more content segments to one or more media players; (b) a packet timing module configured to: (i) retrieve a time stamp value associated with a content segment of a media stream, wherein the media stream comprises one media stream of a plurality of media streams that are to be output from the wireless interface to one or more media players; (ii) identify a target media player associated with the media stream which is associated with the retrieved time stamp value; (iii) retrieve a current system time value associated with the target media player; and (iv) compare the retrieved time stamp value to the identified current system time value; and (c) a packet prioritization module configured to prioritize the delivery of the content segment to the associated media player over the delivery of one or more content segments associated with the one or more other media streams of the plurality of media streams if the retrieved time stamp value is greater than the identified current system time value by less than a predetermined threshold.

According to an embodiment of the invention, the packet prioritization module is configured to deliver content segments of the plurality of media streams to the one or more media players using a default transmission scheduling scheme if the identified current system time value is less than the retrieved time stamp value by more than the predetermined threshold.

According to an embodiment of the invention, the packet prioritization module is configured to discard the content segment without outputting the content segment to the target media player if the retrieved time stamp value is less than the identified current system time value.

An embodiment of the invention described herein may include one or more non-transitory computer readable media having instructions operable to cause one or more processors to perform the operations comprising: (a) retrieving a time stamp value associated with a content segment of a media stream, wherein the media stream comprises one media stream of a plurality of media streams that are to be output from a central device to one or more media players; (b) identifying a target media player associated with the media stream which is associated with the retrieved time stamp value; (c) retrieving a current system time value associated with the target media player; (d) comparing the retrieved time stamp value to the identified current system time value; and (e) if the retrieved time stamp value is greater than the identified current system time value by less than a predetermined threshold, prioritizing the delivery of the content segment to the associated media player over the delivery of one or more content segments associated with the one or more other media streams of the plurality of media streams.

According to an embodiment of the invention, the instructions are further operable to cause one or more processors to perform the operations comprising, if the identified current system time value is less than the retrieved time stamp value by more than the predetermined threshold, delivering content segments of the plurality of media streams to the one or more media players using a default transmission scheduling scheme.

According to an embodiment of the invention, the instructions are further operable to cause one or more processors to perform the operations comprising, if the retrieved time stamp value is less than the identified current system time value, discarding the content segment without outputting the content segment to the target media player.

FIG. 1 is a block diagram illustrating an example network environment 100 operable to facilitate dynamic packet prioritization for delivery of multiple media streams based upon packet time stamp information. In embodiments, a central device 105 may provide video, audio and/or data services to a subscriber by communicating with a wide area network (WAN) 110 through a connection to a subscriber network 115 (e.g., hybrid fiber-coaxial network, fiber network, cellular network, high speed data network, etc.). The central device 105 may include a gateway device, a broadband modem, a wireless router including an embedded modem, or any other device or access point operable to route communications between one or more client devices and a network. The central device 105 may provide a local network 120 for delivering services to one or more client devices 125. The local network 120 may include a local area network (LAN), wireless local area network (WLAN), personal area network (PAN), Multimedia over Coax Alliance (MoCA) network, mobile hotspot network, and others.

A subscriber can request, receive and interact with multimedia and/or data services through a client device 125. A client device 125 may include a set-top box (STB), computer, mobile device, tablet, television, and any other device operable to receive multimedia and/or data services. Multimedia and/or data services may be received at a client device 125 through a connection to a central device 105. It should be understood that a television may receive multimedia and/or data services through a connection to a central device 105 and/or a STB. While the components shown in FIG. 1 are shown separate from each other, it should be understood that the various components can be integrated into each other.

The central device 105 may provide a WLAN for client devices 125 within range of the central device 105 (or within range of an access point or wireless extender configured to route communications between the central device 105 and client devices 125), and multimedia and/or data services may be provided to client devices 125 through wireless communications (e.g., Wi-Fi). The bit rate at which communications are passed over a WLAN may vary according to many different factors, wherein the factors include the number of client devices 125 connected to the WLAN, the strength of a wireless radio signal received at each client device 125 from the central device 105, and others. As a result of a varying bitrate, client devices 125 may buffer multimedia content as it is received. For example, a client device 125 may store packets of a received multimedia stream in a buffer for a period of time before outputting the packets to a decoder, such that the decoder receives the packets at a more consistent bit rate.

When a WLAN provided by a central device 105 becomes congested to a certain point, client devices 125 generally receive multimedia content at a lower bit rate. When the bit rate at which a client device 125 receives content falls to a certain level, the rate at which packets are loaded into the client device's buffer may fall below the rate at which packets are output from the buffer for playback of the associated multimedia content. A shortfall in the bit rate of incoming packets into the buffer can lead to an underflow event, wherein a read pointer catches up to a write pointer at the buffer, and the read pointer is therefore pointing to an empty slot in the buffer. When an underflow event occurs at a buffer, the device's decoder becomes starved of packets needed to output the associated multimedia content at an expected quality level. For example, an underflow event can lead to macro-blocking, a stalled or fragmented picture, or loss of media.

In embodiments, a default packet transmission scheme may be utilized by the central device 105 to deliver packets from multiple media streams to multiple media players or client devices 125. For example, the central device 105 may apply the same audio/video quality of service (QoS) level to each of the media players or client devices 125 receiving a media stream from the central device 105. An equal or round-robin packet distribution scheme (e.g., taking one content segment from a media stream/client device queue and placing it into an outgoing queue, taking one content segment from a next media stream/client device queue and placing it into the outgoing queue, and so on and so forth) may be one such default scheme used by the central device 105, wherein packets are pulled from multiple media stream or client device queues and placed into an outgoing queue (e.g., wireless output queue) for output according to the order in which the packets were placed into the media stream or client device queues. For example, using the equal or round-robin packet distribution scheme, packets from multiple media streams targeted to multiple client devices may be output to the targeted client devices at a common rate. Thus, this equal or round-robin distribution does not prioritize one media stream over another and causes packets of multiple media streams to be output to the multiple client devices at an equal rate.

However, outputting the packets of the media streams at an equal rate does not guarantee that the packets will be received and/or processed by the target client devices at equal rates, as the different client devices may receive different signal levels from the central device 105 and/or may process received content at different speeds. For example, the client devices 125 serviced by the central device 105 may be placed in different rooms throughout a subscriber premise, and with changes in position, each client device 125 may experience a different signal strength level. Client devices 125 located near the central device 105 will likely achieve higher data throughput rates than those client devices 125 that are positioned at greater distances from the central device 125 (even if the client devices 125 are identical hardware wise). Changes in signal strength can also be caused by barriers or other impairments such as building materials (e.g., drywall, brick, etc.) that are positioned between a client device 125 and a central device 105. Sending an amount of data to a client device 125 with a low signal strength can consume significantly more airtime than transmissions of an equivalent amount of data to a client device 125 having a higher signal strength, as the time needed to transmit the amount of data to the client device 125 with the low signal strength will be longer than the time needed to transmit the amount of data to the client device 125 with the higher signal strength. With these clients consuming more than a fair share of airtime, it is possible that other clients, even those situated close to the central device 105 may end up getting starved (e.g., a buffer at the client may run out of packets for decoding and presenting a media stream, thereby causing macro blocking, video freezes, etc.) when the media streams are output to the clients at a common level of priority (e.g., equivalent rate of packet transmission from the central device 105). Thus, varying data rates may cause a buffer at one client device 125 to empty quicker than the buffer of another client device 125 receiving content from the same central device 105.

In embodiments, the central device 105 may be configured to monitor the status of a plurality of client devices 125 receiving one or more media streams from the central device 105, and the central device 105 may determine the status of a client device 125 based upon a comparison between time stamp information associated with a packet that is to be delivered to the client device 125 as part of a media stream and a system time value associated with the client device 125. For example, the central device 105 may retrieve time stamp information from a received content segment (e.g., MPEG (moving picture experts group) audio/video packet, voice packet, best effort packet, background traffic packet, etc.), and the time stamp information may be, for example, a presentation time stamp (PTS) or decode time stamp (DTS) carried by the content segment. The time stamp information may specify an instance in time (e.g., relative to a system time clock, timing information of other content segments within the media stream, etc.) at which the content segment should be delivered/decoded by a client device 125 receiving and outputting the corresponding content to a viewer. If the content segment arrives at the target client device 125 after the instance in time specified by the time stamp information, the client device 125 may fail to decode and present the content carried by the content segment and the viewer may experience macro blocking, video freezes, or other issues. In embodiments, a system time value may be maintained at a client device 125. For example, the client device 125 may maintain a local synchronization clock (the system time clock (STC)), and may utilize the local synchronization clock to control the timing for decoding received content segments (i.e., the client device 125 may compare the current STC value to the PTS values of received packets, and the client device 125 may decode a packet when the PTS value of the packet matches the current STC value). The central device 105 may control the STC at each client device 125 in order to keep the client devices 125 in synchronization with a media stream being delivered to the client device 125. For example, the central device 105 may periodically (e.g., every 100 ms or other periodic duration) send STC synchronization information to a client device 125 via a program clock reference (PCR).

In embodiments, the central device 105 may parse content segments (e.g., MPEG packets) that are being processed for transmission to various associated client devices 125 and may retrieve time stamp information (e.g., PTS) from the segments. The central device 105 may identify a system time value (e.g., STC) associated with each of the client devices 125, for example, from the PCR. With both the time stamp information of a segment and the system time value for a client device 125, the central device 105 may determine the difference between the time stamp value and the system time value. The determined difference between the two time values may be used by the central device 105 to determine an urgency of a content segment's delivery to a target client device 125. For example, if the difference between the two time values is less than a predetermined threshold, the central device 105 may determine that the client device 125 is nearing a point of being starved for packets. It should be understood that the predetermined threshold may be established at a central device 105 as a configuration parameter and may be updated by a subscriber, installer, content or service provider, or others. It should be further understood that the predetermined threshold may vary according to multiple factors including, but not limited to, the bandwidth available to the central device 105, the number of devices associated with the central device 105, the bitrate required for transmission of one or more media streams from the central device 105, the speed at which content is processed by one or more devices associated with the central device 105, and others.

In embodiments, when the central device 105 determines that a client device 125 is nearing a point of packet starvation (i.e., the difference between a time stamp value and a system time value is less than a predetermined threshold), the central device 105 may prioritize the delivery of packets to the associated target device. For example, the central device 105 may deviate from a default packet transmission schedule by placing the packet associated with the time stamp value ahead of packets from other media streams in a queue of packets that are to be transmitted from the central device 105. It should be understood that more than one packet from the media stream designated for output to the target client device 125 (e.g., the client device 125 determined to be in a critical state) may be placed into the output queue ahead of packets from other media streams when the central device 105 is configured to transmit packets in bursts (e.g., multiple packets transmitted at once).

As an example, the central device 105 may parse MPEG packets which are pending in a client stream queue (i.e., packets which are waiting to be placed in a wireless transmission queue) at the central device 105. A PTS value may be extracted from each packet, and may then be compared to the STC value the central device 105 is maintaining for the target client device 125. It will be appreciated by those skilled in the relevant art that the central device 105 may be configured to process and take into account discontinuities in the PTS count when comparing the extracted PTS value to the STC value. When the central device 105 identifies a difference between a PTS value and a STC value that is less than a predetermined threshold (e.g., 10 ms, 5 ms, etc.), the central device 105 may determine that the target client device 125 (i.e., the client device 125 to which the packet carrying the PTS value is to be delivered) has reached a critical point (e.g., that a buffer of the target client device 125 is nearing the point of starvation). When the central device 105 determines that a target client device 125 has reached a critical point, the central device 105 may prioritize the delivery of packets to the target client device 125 over the delivery of packets to other client devices 125. For example, one or more packets may be moved from a packet queue associated with the target client device 125 to a wireless transmission queue before packets from queues associated with other client devices 125.

After a target client device 125 has been determined to be in a critical state, and after taking a deviating, corrective action by manipulating the placement of packet(s) from the media stream into an output queue, the central device 105 may continue to check packets in other client/media stream queues, taking corrective prioritization actions, until all packets have been placed in the output queue. When a client device 125 is determined to be in a critical state, the central device 105 may determine that the client device 125 is processing and outputting packets for display at a faster rate than the rate at which packets of the media stream are being delivered to the client device 125 from the central device 105. If no media streams or client devices 125 are determined to be in a critical state based on comparisons between PTS and STC values, the central device 105 may continue to use a default transmission scheme (e.g., round robin) for outputting packets to the associated client devices 125. It should be understood that the predetermined threshold configured at the central device 105 for determining the point at which a client device 125 reaches a critical state may change as wireless transmission data rates increase.

In embodiments, the central device 105 may be configured to discard packets from a queue when a comparison between a packet time stamp value and a system time value indicates that the packet has expired or has otherwise missed a scheduled time for output. A target client device 125 may be configured to decode and output for display a packet when the PTS value of the packet matches a current STC value of the target client device 125. When the PTS value of a packet is earlier in time than the current STC value of a target client device 125, the packet will not be decoded and will be discarded by the target client device 125. Having retrieved both the PTS value of a packet and the current STC value of a target client device 125, the central device 105 may refrain from outputting a packet to the target client device 125 and may instead discard the packet when the PTS value of the packet is less than the STC value of the target client device 125.

In embodiments, where the central device 105 determines that multiple client devices 125 are in a critical state, the central device 105 may identify one or more of the multiple client devices 125 for which to increase the rate of packet transmissions. The central device 105 may further determine that service flow(s) to one or more client devices may be temporarily terminated or delayed to account for the increased rate of packet transmissions targeted at another client device 125. The determination may be based on priority levels associated with each of the client devices 125, and the priority levels may be based upon a variety of parameters or characteristics (e.g., type of data flow delivered to the client device, subscription level associated with the client device, primary user of the client device, etc.). For example, a certain user or device within a subscriber premise (e.g., Dad's television) may be given priority over other users or devices, and certain content that a user has purchased (e.g., pay-per view content, video on-demand (VoD) content, etc.) may be given priority over other types of content.

Figure 2A:
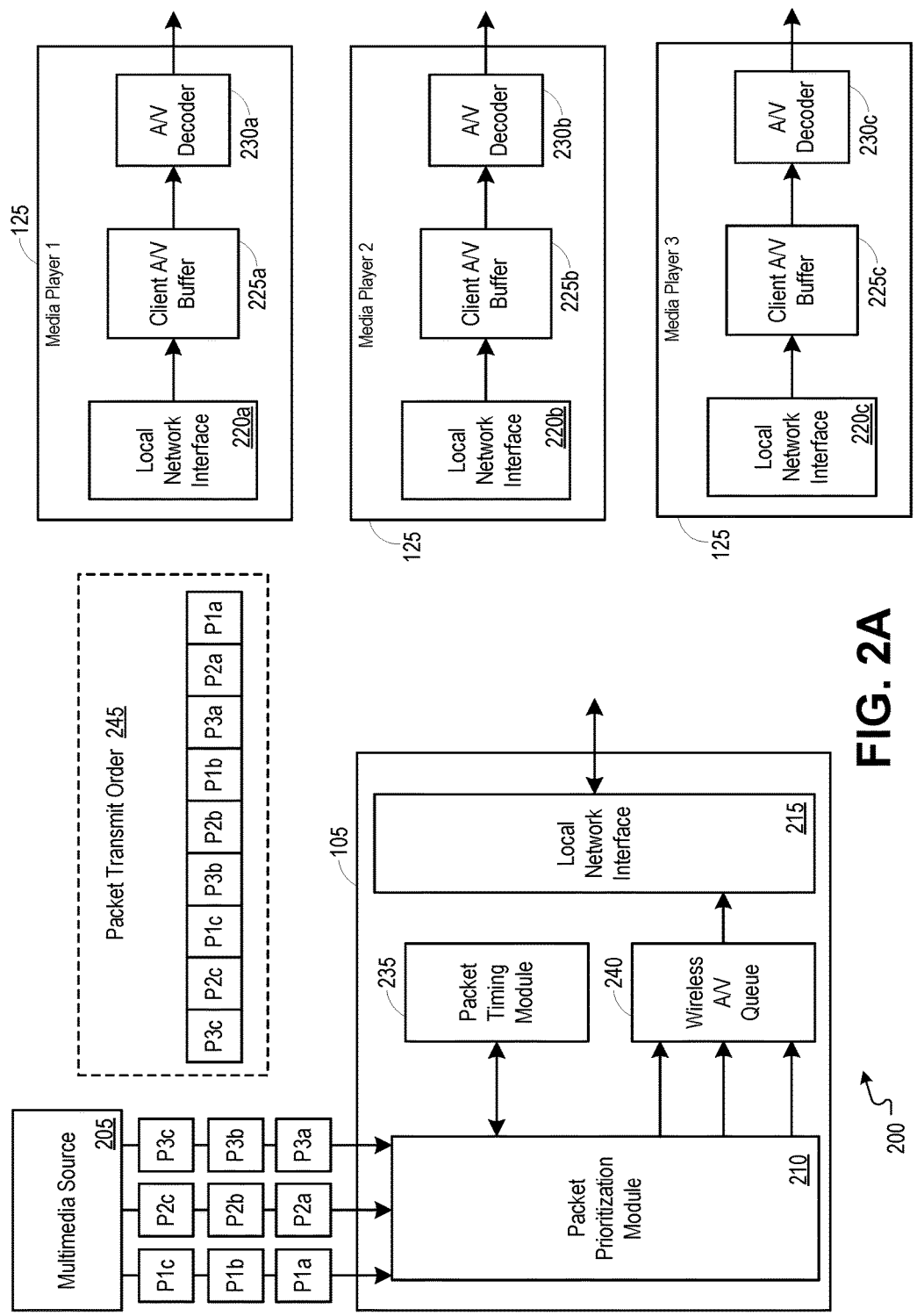
FIG. 2A is a block diagram illustrating an example network environment operable to facilitate dynamic packet prioritization for delivery of multiple media streams, wherein packet time stamp information dictates a default packet delivery schedule.

FIG. 2A is a block diagram illustrating an example network environment 200 operable to facilitate dynamic packet prioritization for delivery of multiple media streams, wherein packet time stamp information dictates a default packet delivery schedule. According to FIG. 2A, client devices 125 (e.g., media players 1-3) are receiving packets from a central device 105 at a rate that is sufficient to sustain the rate at which packets are being consumed by each of the client devices 125. In other words, each of the media players 1-3 have buffered enough packets of a received media stream to maintain at least a predetermined threshold difference between a current system time value (e.g., STC) and a time value of a next packet that is to be received at the media player (e.g., a PTS value of a packet that is next to be delivered to the media player).

In embodiments, the central device 105 may receive one or more media streams from a multimedia source 205. The media streams may be received at the central device 105 as one or more packet streams. As an example, a packet stream destined for media player 1 is received at the central device 105 as packets P1a-c, a packet stream destined for media player 2 is received at the central device 105 as packets P2a-c, and a packet stream destined for media player 3 is received at the central device 105 as packets P3a-c.

In embodiments, packet streams may be received at the central device 105 by a packet prioritization module 210. The packet prioritization module 210 may control the rate at which packets are transmitted to individual devices (e.g., media players 1-3). The rate at which packets are transmitted to individual devices may be based upon the congestion of a network used for delivering content to the client devices 125, the strength of a signal between the central device 105 and a client device 125, and/or packet time stamp information associated with one or more packets at a client device 125 and packet time stamp information associated with one or more packets that are to be transmitted to the client device 125 from the central device 105.

In embodiments, packets may be output from a local network interface 215 of the central device 105 and may be received at a client device 125 through a local network interface 220a-c. As packets are received at a client device 125, the received packets may be placed into a buffer (e.g., client A/V (audio/video) buffer 225a-c). From the client A/V buffers 225a-c, packets may be moved to and decoded by an A/V decoder 230a-c. As an example, a buffer may be filled from the bottom to the top, wherein a packet is written into a buffer at the position of a write pointer, and the write pointer may be positioned at the highest available slot in the buffer. Packets may be read or removed from the bottom of the client A/V buffers 225a-c by an A/V decoder 230a-c, and may be output from an A/V decoder 230a-c to a display device associated with the respective client device 125. Those skilled in the relevant art will appreciate that this is only one example type of buffer, and that various types of buffers may be used as the client A/V buffers 225a-c.

In embodiments, the packet prioritization module 210 may determine a client device's need for additional packet(s) based upon a comparison between timing information associated with packet(s) that are to be delivered to the client device and timing information associated with the client device. A packet timing module 235 may retrieve timing information from one or more packets that are received by the central device 105 and that are to be transmitted to a client device 125, and the packet timing module 235 may retrieve timing information associated with the client device 125 to which the one or more packets are to be transmitted. For example, the packet timing module 235 may retrieve time stamp information from a received content segment (e.g., MPEG (moving picture experts group) audio/video packet), and the time stamp information may be, for example, a presentation time stamp (PTS) carried by the content segment. A client device 125 may maintain a local synchronization clock (the system time clock (STC)), and may utilize the local synchronization clock to control the timing for decoding received content segments, and the central device 105 may control the STC at each client device 125 in order to keep the client devices 125 in synchronization with a media stream being delivered to the client device 125. For example, the central device 105 may periodically (e.g., every 100 ms or other periodic duration) send STC synchronization information to a client device 125 via a program clock reference (PCR).

In embodiments, the packet timing module 235 may parse content segments (e.g., packets P1a-c, P2a-c, and P3a-c) that are being received at the packet prioritization module and processed for transmission to the client devices 125, and the packet timing module 235 may retrieve time stamp information (e.g., PTS) from the segments. For example, the packet timing module 235 may parse MPEG packets which are pending in a client stream queue (i.e., packets which are waiting to be placed into the wireless A/V queue 240 for output) at the central device 105. The packet timing module 235 may identify a system time value (e.g., STC) associated with each of the client devices 125, for example, from the PCR that is output to each client device 125. With both the time stamp information of a segment and the system time value for a client device 125, the packet timing module 235 may determine the difference between the time stamp value and the system time value. The packet prioritization module 210 may be notified of the determined difference between the two time values, and the difference may be used by the packet prioritization module 210 to determine an urgency of a content segment's delivery to a target client device 125. For example, if the difference between the two time values is less than a predetermined threshold, the packet prioritization module 210 may prioritize the delivery of packets to the associated target device. The packet prioritization module 210 may deviate from a default packet transmission schedule to place the packet associated with the time stamp value ahead of packets from other media streams in the wireless A/V queue 240. For example, one or more packets may be moved from a packet queue associated with the target client device 125 to the wireless A/V queue 240 before packets from queues associated with other client devices 125.

In embodiments, the packet prioritization module 210 may be configured to discard packets from a queue when the PTS value of a packet is earlier in time than the current STC value of a target client device 125. Having retrieved both the PTS value of a packet and the current STC value of a target client device 125, the packet prioritization module 210 may refrain from placing the packet into the wireless A/V queue 240 and may instead discard the packet when the PTS value is less than the STC value.

In embodiments, the packet prioritization module 210 can prioritize packet transmissions by regulating the rate and/or order at which packets are transmitted to client devices 125. For example, when the packet prioritization module 210 determines that none of the client devices 125 (or media players 1-3) are in need of an increased packet transmission rate, the packet prioritization module 210 can schedule the output of packets to the client devices evenly or at a common rate. As an example, where none of the client devices 125 (or media players 1-3) are in need of an increased packet transmission rate, the output of packets to the media players 1-3 may be scheduled at a 1:1:1 (media player 1: media player 2: media player 3) ratio.

In embodiments, the packet prioritization module 210 can regulate the rate at which packets are transmitted to client devices 125 by manipulating the order in which packets are placed into a wireless A/V queue 240. For example, when none of the media players 1-3 are in need of an increased packet transmission rate, the packet prioritization module 210 may cause the packets of the received media streams to be placed in an even distribution into the wireless A/V queue 240 (e.g., packets may be taken from the media streams and placed into the buffer using a round-robin distribution method). Packets buffered within the wireless A/V queue 240 may be output, in the order in which the packets are placed into the queue, to an associated client device 125 through the local network interface 215 (e.g., Wi-Fi, Ethernet, MoCA (multimedia over coax alliance), etc.). As an example, where none of the media players 1-3 are in need of an increased packet transmission rate (i.e., the packet timing module determines that none of the media streams designated for output by the central device 105 include a packet with a PST value that is greater than a STC value of a target client device 125 by less than a predetermined threshold), the packets of the received media streams are placed into the wireless A/V queue 240 according to an even distribution, and transmission of the packets from the wireless A/V queue 240 would result in the packet transmit order 245.

Figure 2B:
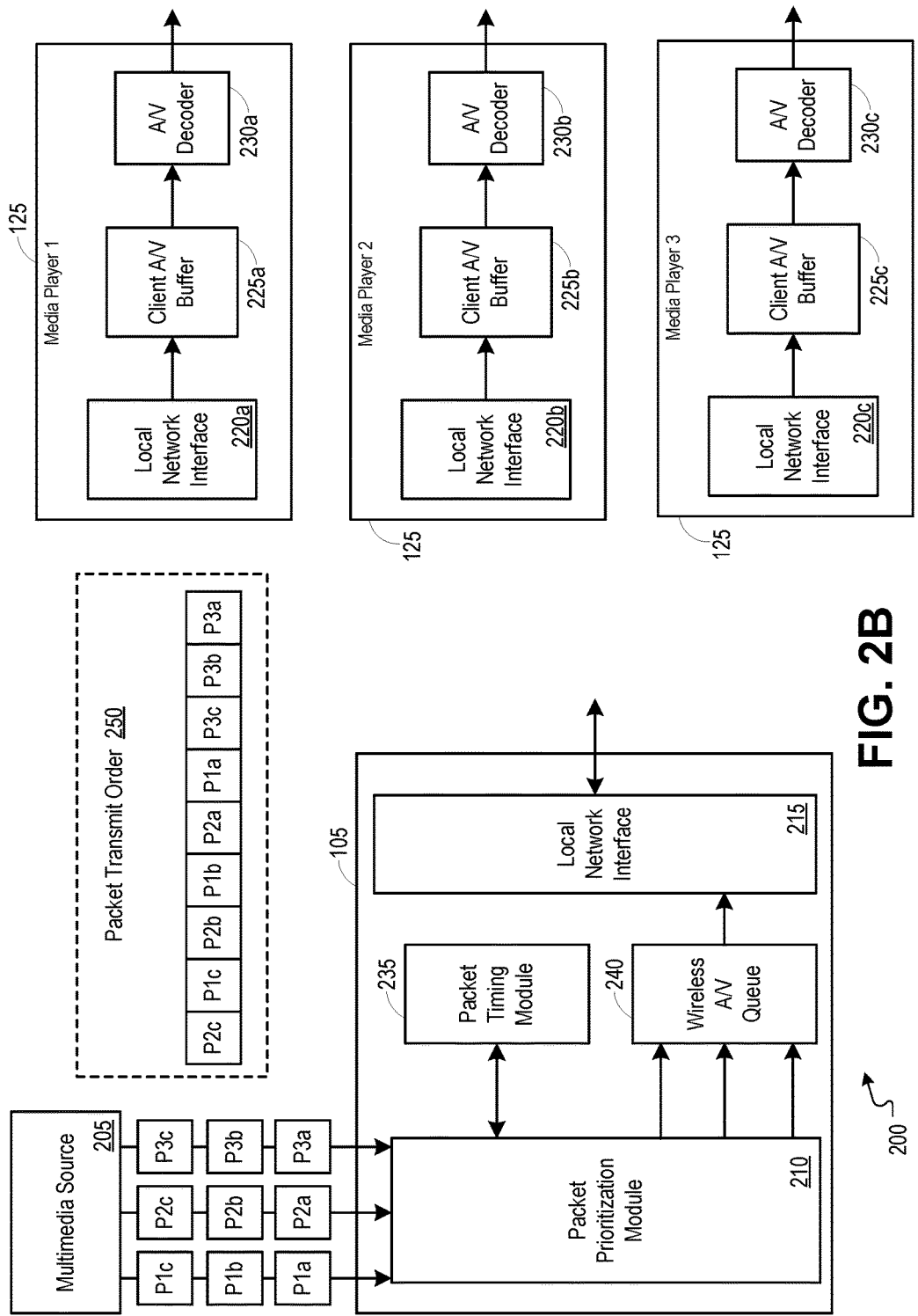
FIG. 2B is a block diagram illustrating an example network environment operable to facilitate dynamic packet prioritization for delivery of multiple media streams, wherein packet time stamp information dictates a prioritization of packet delivery for a media stream.

FIG. 2B is a block diagram illustrating an example network environment 200 operable to facilitate dynamic packet prioritization for delivery of multiple media streams, wherein packet time stamp information dictates a prioritization of packet delivery for a media stream. According to FIG. 2B, media players 1 and 2 are receiving packets from a central device 105 at a rate that is sufficient to sustain the rate at which packets are being consumed by each of the media players 1 and 2, whereas media player 3 is not receiving packets from the central device 105 at a rate sufficient to sustain the rate at which packets are being consumed by the media player 3. In other words, each of the media players 1 and 2 have buffered enough packets of a received media stream to maintain at least a predetermined threshold difference between a current system time value (e.g., STC) and a time value of a next packet that is to be received at the media players 1 and 2 (e.g., a PTS value of a packet that is next to be delivered to the media player), while a difference between a current system time value (e.g., STC) of the media player 3 and a time value of a next packet that is to be received at the media player 3 (e.g., PTS) is small enough to indicate that the media player 3 has reached or is reaching a point of packet starvation within an associated buffer (e.g., the media player 3 has reached a critical state).

In embodiments, the central device 105 may receive one or more media streams from a multimedia source 205. The media streams may be received at the central device 105 as one or more packet streams. As an example, a packet stream destined for media player 1 is received at the central device 105 as packets P1a-c, a packet stream destined for media player 2 is received at the central device 105 as packets P2a-c, and a packet stream destined for media player 3 is received at the central device 105 as packets P3a-c.

In embodiments, packet streams may be received at the central device 105 by a packet prioritization module 210. The packet prioritization module 210 may control the rate at which packets are transmitted to individual devices (e.g., media players 1-3). The rate at which packets are transmitted to individual devices may be based upon the congestion of a network used for delivering content to the client devices 125, the strength of a signal between the central device 105 and a client device 125, and/or packet time stamp information associated with one or more packets at a client device 125 and packet time stamp information associated with one or more packets that are to be transmitted to the client device 125 from the central device 105.

In embodiments, packets may be output from a local network interface 215 of the central device 105 and may be received at a client device 125 through a local network interface 220a-c. As packets are received at a client device 125, the received packets may be placed into a buffer (e.g., client A/V (audio/video) buffer 225a-c). From the client A/V buffers 225a-c, packets may be moved to and decoded by an A/V decoder 230a-c. As an example, a buffer may be filled from the bottom to the top, wherein a packet is written into a buffer at the position of a write pointer, and the write pointer may be positioned at the highest available slot in the buffer. Packets may be read or removed from the bottom of the client A/V buffers 225a-c by an A/V decoder 230a-c, and may be output from an A/V decoder 230a-c to a display device associated with the respective client device 125. Those skilled in the relevant art will appreciate that this is only one example type of buffer, and that various types of buffers may be used as the client A/V buffers 225a-c.

In embodiments, the packet prioritization module 210 may determine a client device's need for additional packet(s) based upon a comparison between timing information associated with packet(s) that are to be delivered to the client device and timing information associated with the client device. A packet timing module 235 may retrieve timing information from one or more packets that are received by the central device 105 and that are to be transmitted to a client device 125, and the packet timing module 235 may retrieve timing information associated with the client device 125 to which the one or more packets are to be transmitted. For example, the packet timing module 235 may retrieve time stamp information from a received content segment (e.g., MPEG (moving picture experts group) audio/video packet), and the time stamp information may be, for example, a presentation time stamp (PTS) carried by the content segment. A client device 125 may maintain a local synchronization clock (the system time clock (STC)), and may utilize the local synchronization clock to control the timing for decoding received content segments, and the central device 105 may control the STC at each client device 125 in order to keep the client devices 125 in synchronization with a media stream being delivered to the client device 125. For example, the central device 105 may periodically (e.g., every 100 ms or other periodic duration) send STC synchronization information to a client device 125 via a program clock reference (PCR).

In embodiments, the packet timing module 235 may parse content segments (e.g., packets P1a-c, P2a-c, and P3a-c) that are being received at the packet prioritization module 210 and processed for transmission to the client devices 125, and the packet timing module 235 may retrieve time stamp information (e.g., PTS) from the segments. For example, the packet timing module 235 may parse MPEG packets which are pending in a client stream queue (i.e., packets which are waiting to be placed into the wireless A/V queue 240 for output) at the central device 105. The packet timing module 235 may identify a system time value (e.g., STC) associated with each of the client devices 125, for example, from the PCR that is output to each client device 125. With both the time stamp information of a segment and the system time value for a client device 125, the packet timing module 235 may determine the difference between the time stamp value and the system time value. The packet prioritization module 210 may be notified of the determined difference between the two time values, and the difference may be used by the packet prioritization module 210 to determine an urgency of a content segment's delivery to a target client device 125. For example, if the difference between the two time values is less than a predetermined threshold, the packet prioritization module 210 may prioritize the delivery of packets to the associated target device. The packet prioritization module 210 may deviate from a default packet transmission schedule to place the packet associated with the time stamp value ahead of packets from other media streams in the wireless A/V queue 240. For example, one or more packets may be moved from a packet queue associated with the target client device 125 to the wireless A/V queue 240 before packets from queues associated with other client devices 125.

In embodiments, the packet prioritization module 210 may be configured to discard packets from a queue when the PTS value of a packet is earlier in time than the current STC value of a target client device 125. Having retrieved both the PTS value of a packet and the current STC value of a target client device 125, the packet prioritization module 210 may refrain from placing the packet into the wireless A/V queue 240 and may instead discard the packet when the PTS value is less than the STC value.

In embodiments, the packet prioritization module 210 can prioritize packet transmissions by regulating the rate and/or order at which packets are transmitted to client devices 125. For example, as is the case in FIG. 2B, when the packet prioritization module 210 determines that a media player (e.g., media player 3) is in need of an increased packet transmission rate (i.e., the difference between a PTS value of a next packet to be transmitted to the media player 3 and a STC value associated with the media player 3 is less than a predetermined threshold), the packet prioritization module 210 can schedule the output of packets to the media player 3 ahead of packets to be delivered to the other media players. As an example, where media player 3 is in need of an increased packet transmission rate, the output of packets to the media players 1-3 may be scheduled at a 1:1:2 (media player 1: media player 2: media player 3) ratio, such that the delivery of packets to media player 3 is prioritized over the delivery of packets to media players 1 and 2 by outputting packets to media player 3 at a higher rate than the rate at which packets are output to each of the media players 1 and 2.

In embodiments, the packet prioritization module 210 can regulate the rate at which packets are transmitted to client devices 125 by manipulating the order in which packets are placed into a wireless A/V queue 240. For example, when media player 3 is in need of an increased packet transmission rate, the packet prioritization module 210 may cause the packets of the media stream targeted for delivery to the media player 3 (e.g., P3a-c) to be placed into the wireless A/V queue 240 ahead of packets from other media streams that are to be delivered to other media players (e.g., P1a-c and P2a-c). Packets buffered within the wireless A/V queue 240 may be output, in the order in which the packets are placed into the queue, to an associated client device 125 through the local network interface 215 (e.g., Wi-Fi, Ethernet, MoCA (multimedia over coax alliance), etc.). As an example, where media player 3 is in need of an increased packet transmission rate (i.e., the packet timing module 235 determines that the media stream targeted for output to media player 3 includes a packet with a PST value that is greater than a STC value of the media player 3 by less than a predetermined threshold), the packets of the received media streams are placed into the wireless A/V queue 240 according to an uneven distribution, wherein packet delivery to media player 3 is favored over packet delivery to the other media players, and transmission of the packets from the wireless A/V queue 240 would result in the packet transmit order 250. It should be understood that the delivery of multiple packets from a media stream may be prioritized over the delivery of packets from other media streams when the packet timing module 235 determines that multiple packets of the prioritized media stream include a PTS value that is greater than a STC value of a target media player by less than the predetermined threshold. In the example provided by FIG. 2B, each of packets P3a-c include a PTS value that is greater than a STC value of the target media player by less than the predetermined threshold, and are thus placed in the wireless A/V queue 240 for transmission ahead of the packets of the other media streams.

Figure 2C:
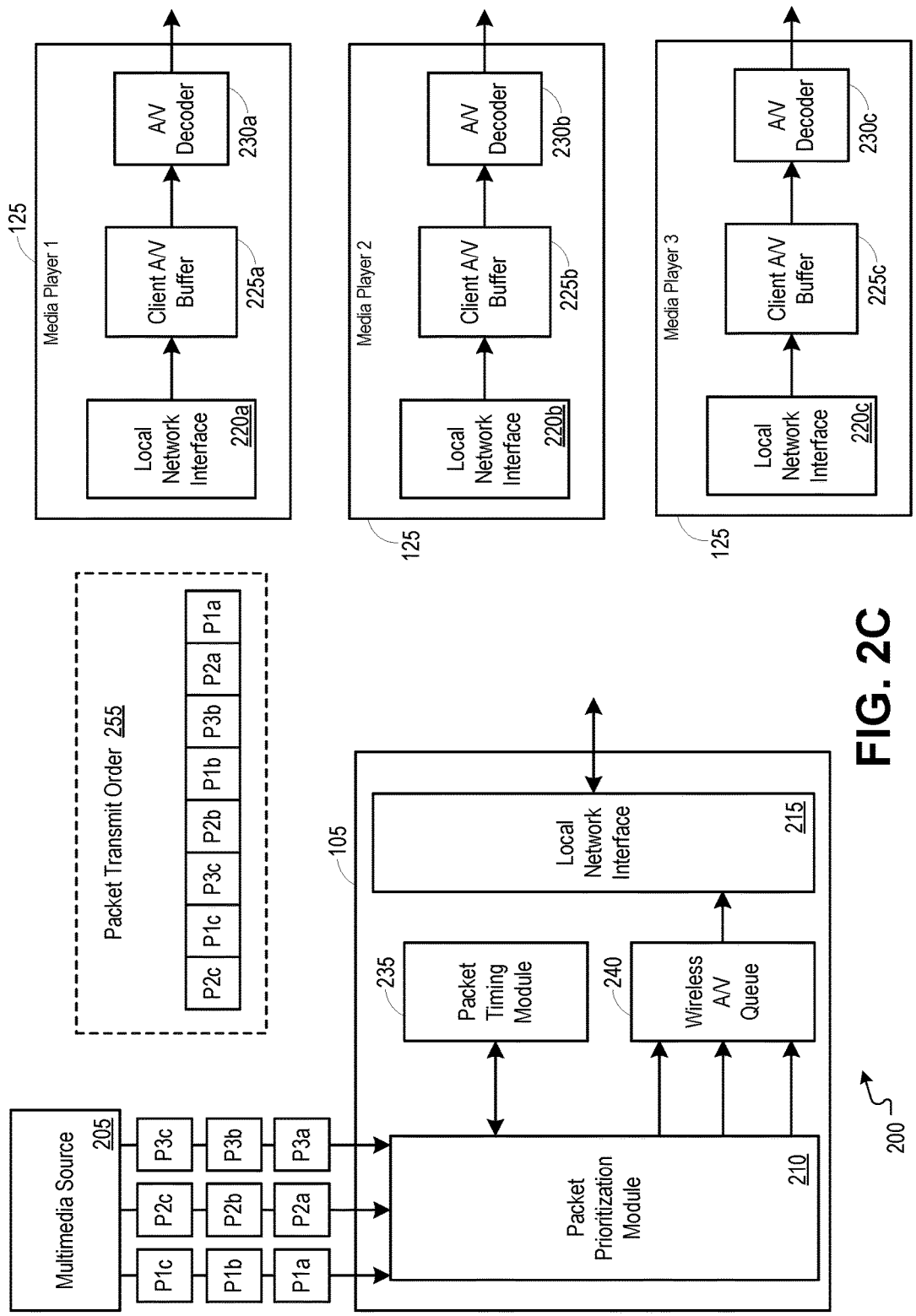
FIG. 2C is a block diagram illustrating an example network environment operable to facilitate dynamic packet prioritization for delivery of multiple media streams, wherein packet time stamp information dictates the discarding of an expired packet.

FIG. 2C is a block diagram illustrating an example network environment 200 operable to facilitate dynamic packet prioritization for delivery of multiple media streams, wherein packet time stamp information dictates the discarding of an expired packet. According to FIG. 2C, a packet of a media stream targeted for delivery to media player 3 (e.g., packet P3a) has a time stamp value indicating that the time for decoding and output of the packet by the media player 3 has passed. In other words, the PTS value of the packet P3a is less than the current STC value associated with the targeted media player 3.

In embodiments, the central device 105 may receive one or more media streams from a multimedia source 205. The media streams may be received at the central device 105 as one or more packet streams. As an example, a packet stream destined for media player 1 is received at the central device 105 as packets P1a-c, a packet stream destined for media player 2 is received at the central device 105 as packets P2a-c, and a packet stream destined for media player 3 is received at the central device 105 as packets P3a-c.

In embodiments, packet streams may be received at the central device 105 by a packet prioritization module 210. The packet prioritization module 210 may control the rate at which packets are transmitted to individual devices (e.g., media players 1-3). The rate at which packets are transmitted to individual devices may be based upon the congestion of a network used for delivering content to the client devices 125, the strength of a signal between the central device 105 and a client device 125, and/or packet time stamp information associated with one or more packets at a client device 125 and packet time stamp information associated with one or more packets that are to be transmitted to the client device 125 from the central device 105.

In embodiments, packets may be output from a local network interface 215 of the central device 105 and may be received at a client device 125 through a local network interface 220a-c. As packets are received at a client device 125, the received packets may be placed into a buffer (e.g., client A/V (audio/video) buffer 225a-c). From the client A/V buffers 225a-c, packets may be moved to and decoded by an A/V decoder 230a-c. As an example, a buffer may be filled from the bottom to the top, wherein a packet is written into a buffer at the position of a write pointer, and the write pointer may be positioned at the highest available slot in the buffer. Packets may be read or removed from the bottom of the client A/V buffers 225a-c by an A/V decoder 230a-c, and may be output from an A/V decoder 230a-c to a display device associated with the respective client device 125. Those skilled in the relevant art will appreciate that this is only one example type of buffer, and that various types of buffers may be used as the client A/V buffers 225a-c.

In embodiments, the packet prioritization module 210 may determine a client device's need for additional packet(s) based upon a comparison between timing information associated with packet(s) that are to be delivered to the client device and timing information associated with the client device. A packet timing module 235 may retrieve timing information from one or more packets that are received by the central device 105 and that are to be transmitted to a client device 125, and the packet timing module 235 may retrieve timing information associated with the client device 125 to which the one or more packets are to be transmitted. For example, the packet timing module 235 may retrieve time stamp information from a received content segment (e.g., MPEG (moving picture experts group) audio/video packet), and the time stamp information may be, for example, a presentation time stamp (PTS) carried by the content segment. A client device 125 may maintain a local synchronization clock (the system time clock (STC)), and may utilize the local synchronization clock to control the timing for decoding received content segments, and the central device 105 may control the STC at each client device 125 in order to keep the client devices 125 in synchronization with a media stream being delivered to the client device 125. For example, the central device 105 may periodically (e.g., every 100 ms or other periodic duration) send STC synchronization information to a client device 125 via a program clock reference (PCR).

In embodiments, the packet timing module 235 may parse content segments (e.g., packets P1a-c, P2a-c, and P3a-c) that are being received at the packet prioritization module 210 and processed for transmission to the client devices 125, and the packet timing module 235 may retrieve time stamp information (e.g., PTS) from the segments. For example, the packet timing module 235 may parse MPEG packets which are pending in a client stream queue (i.e., packets which are waiting to be placed into the wireless A/V queue 240 for output) at the central device 105. The packet timing module 235 may identify a system time value (e.g., STC) associated with each of the client devices 125, for example, from the PCR that is output to each client device 125. With both the time stamp information of a segment and the system time value for a client device 125, the packet timing module 235 may determine the difference between the time stamp value and the system time value. The packet prioritization module 210 may be notified of the determined difference between the two time values, and the difference may be used by the packet prioritization module 210 to determine an urgency of a content segment's delivery to a target client device 125. For example, if the difference between the two time values is less than a predetermined threshold, the packet prioritization module 210 may prioritize the delivery of packets to the associated target device. The packet prioritization module 210 may deviate from a default packet transmission schedule to place the packet associated with the time stamp value ahead of packets from other media streams in the wireless A/V queue 240. For example, one or more packets may be moved from a packet queue associated with the target client device 125 to the wireless A/V queue 240 before packets from queues associated with other client devices 125.

In embodiments, the packet prioritization module 210 may be configured to discard packets from a queue when the PTS value of a packet is earlier in time than the current STC value of a target client device 125. Having retrieved both the PTS value of a packet and the current STC value of a target client device 125, the packet prioritization module 210 may refrain from placing the packet into the wireless A/V queue 240 and may instead discard the packet when the PTS value is less than the STC value. As an example, where the PTS value of packet P3a is less than the STC value of the targeted media player 3, the packet timing module 235 may determine that the packet P3a should be discarded, and the packet prioritization module 210 may discard the packet P3a without adding the packet P3a to the wireless A/V queue 240 for transmission. The transmission of the packets from the wireless A/V queue 240 would result in the packet transmit order 255.

Figure 3:
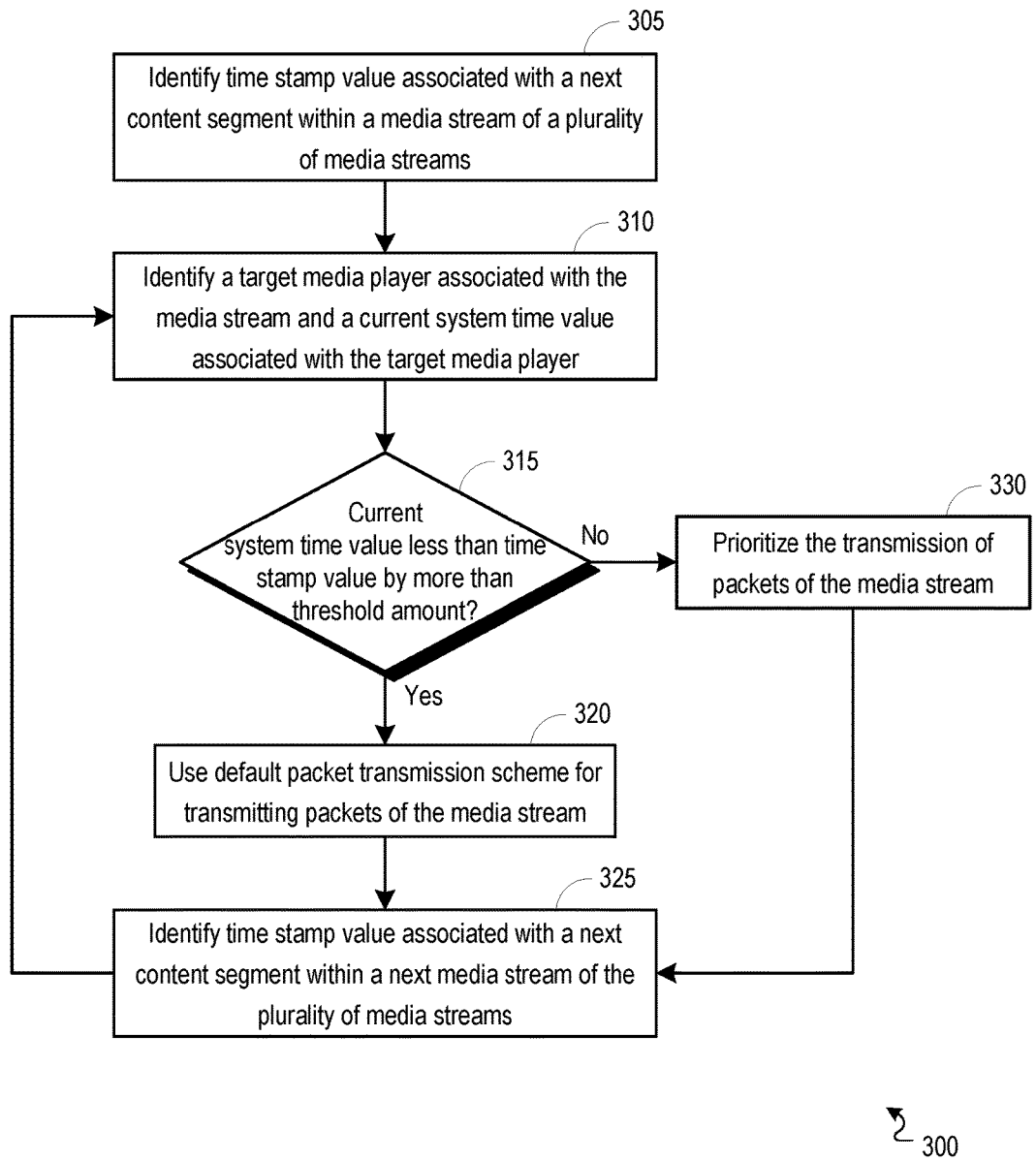
FIG. 3 is a flowchart illustrating an example process operable to facilitate dynamic packet prioritization for delivery of multiple media streams based upon packet time stamp information.

FIG. 3 is a flowchart illustrating an example process 300 operable to facilitate dynamic packet prioritization for delivery of multiple media streams based upon packet time stamp information. The process 300 may be carried out by a central device 105 of FIG. 1 while outputting communications to a plurality of client devices (e.g., client devices 125 of FIG. 1). It should be understood that the process 300 may be carried out continuously, periodically, or conditionally. For example, transmissions of communications to one or more of a plurality of client devices may be prioritized when resources of the central device 105 and/or corresponding local network (e.g., local network 120 of FIG. 1) become congested or when packet timing information indicates a potential shortage of buffered packets at a client device.

At 305, a time stamp value associated with a next content segment within a media stream may be identified. The media stream may be one of a plurality of media streams received and output by a central device 105. The time stamp value associated with the next content segment may be identified, for example, by a packet timing module 235 of FIG. 2. In embodiments, the packet timing module 235 may retrieve the time stamp value from the next content segment as the segment is received by the central device 105, as the segment is stored or buffered at the central device 105, as the segment is decoded by the central device 105, or at some other time after the segment is received by the central device 105. For example, the time stamp value may be a PTS (presentation time stamp) of an MPEG audio/video packet.

At 310, a target media player associated with the media stream and a current system time value associated with the target media player may be identified. The target media player and the current system time value of the target media player may be identified, for example, by the packet timing module 235. In embodiments, the packet timing module 235 may identify the target media player from address information identifying the target device within the media stream or from a queue within which packets of the media stream are temporarily held for delivery at the central device 105. The packet timing module 235 may retrieve a system time clock (STC) value associated with the target media player from a synchronization message (e.g., PCR (program clock reference)) that is output from the central device 105 to the target media player.

At 315, a determination may be made whether the identified current system time value is less than the identified time stamp value by more than a threshold amount. The determination may be made, for example, by the packet timing module 235. In embodiments, the packet timing module 235 may compare the identified current system time value to the identified time stamp value, and, if the difference between the identified current system time value and the identified time stamp value is greater than a predetermined threshold and the identified current system time value is less than the identified time stamp value, the packet timing module 235 may determine that the target media player does not require an increased packet transmission rate. It will be appreciated by those skilled in the relevant art that the predetermined threshold may be established at a central device 105 as a configuration parameter and may be updated by a user, technician, service/content provider, or other. The predetermined threshold may vary according to bandwidth available to the central device 105, the speed at which the central device 105 is able to transmit packets to one or more client devices 125, the bitrate required by content delivered from the central device 105 to a client device 125, and others.

If, at 315, the determination is made that the identified current system time value is less than the identified time stamp value by more than a threshold amount, the process 300 may proceed to 320. At 320, a previously utilized or a default packet transmission scheme may be used for transmitting packets of the media stream to the target media player. The default packet transmission scheme may be used, for example, by the packet prioritization module 210 of FIG. 2. In embodiments, the default packet transmission scheme may be an even distribution (e.g., round-robin) of packets from each of a plurality of media streams received at the central device 105 into a buffer for transmission to one or more client devices 125. It should be understood that the default packet transmission scheme may vary according to one or more configuration settings at the central device 105 and that the transmission scheme may not be an even distribution of packets into a buffer. For example, the central device 105 may be configured with default priority settings that require that a certain client device 125 receive packet transmissions at a higher rate than other client devices 125.

At 325, a time stamp value associated with a next content segment within a next media stream may be identified. The next media stream may be another one of the plurality of media streams received and output by the central device 105. The time stamp value associated with the next content segment may be identified, for example, by a packet timing module 235 of FIG. 2. In embodiments, the packet timing module 235 may retrieve the time stamp value from the next content segment as the segment is received by the central device 105, as the segment is stored or buffered at the central device 105, as the segment is decoded by the central device 105, or at some other time after the segment is received by the central device 105. For example, the time stamp value may be a PTS (presentation time stamp) of an MPEG audio/video packet. After the time stamp value associated with the next content segment within the next media stream, the process may return to 310 where a target media player associated with the next media stream and a current system time value associated with the target media player are identified.

Returning to 315, if the determination is made that the identified current system time value is not less than the identified time stamp value by more than a threshold amount, the process 300 may proceed to 330. At 330, transmission of packets of the media stream may be prioritized. Packet transmission for the media stream may be prioritized, for example, by the packet prioritization module 210. In embodiments, the packet prioritization module 210 may prioritize packet transmissions for a media stream by regulating the rate and/or order at which the packets are transmitted relative to packets of other media streams. For example, when the packet prioritization module 210 determines that the media stream is to be prioritized over the one or more other media streams, the packet prioritization module 210 can schedule the output of packets such that the packets of the media stream are favored over the packets of the one or more other media streams. The packet prioritization module 210 may deviate from a default scheme for moving packets of multiple media streams (e.g., packets within multiple queues designated for multiple media players or client devices 125) by placing the identified content segment into a position within an output queue (e.g., wireless A/V queue 240 of FIG. 2) for immediate transmission to the associated target media player. For example, rather than filling the wireless A/V queue 240 with packets of multiple media streams according to an even distribution, the identified media stream may be prioritized by placing the identified content segment into the wireless A/V queue 240 ahead of a content segment (i.e., packet) from another media stream that would have been placed into the queue ahead of the identified content segment if the even packet transmission scheme (e.g., round robin scheme) had been used. After prioritizing the transmission of packets for the media stream, a time stamp value associated with a next content segment within a next media stream of the plurality of media streams may be identified at 325.

Figure 4:
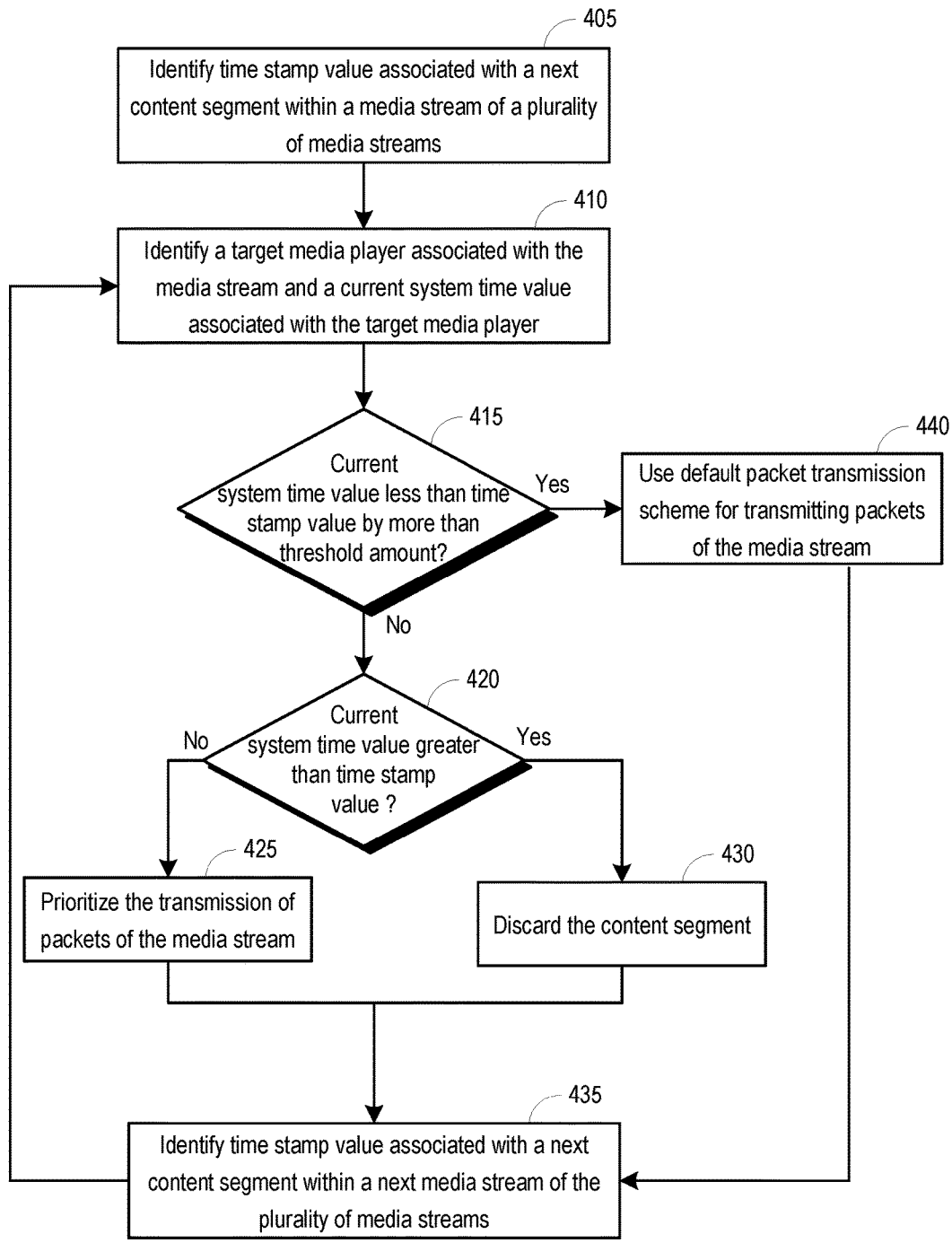
FIG. 4 is a flowchart illustrating an example process operable to facilitate dynamic packet prioritization for delivery of multiple media streams based upon packet time stamp information, wherein late packets are discarded.

FIG. 4 is a flowchart illustrating an example process 400 operable to facilitate dynamic packet prioritization for delivery of multiple media streams based upon packet time stamp information, wherein late packets are discarded. The process 400 may be carried out by a central device 105 of FIG. 1 while outputting communications to a plurality of client devices (e.g., client devices 125 of FIG. 1). It should be understood that the process 400 may be carried out continuously, periodically, or conditionally. For example, transmissions of communications to one or more of a plurality of client devices may be prioritized when resources of the central device 105 and/or corresponding local network (e.g., local network 120 of FIG. 1) become congested or when packet timing information indicates a potential shortage of buffered packets at a client device.

At 405, a time stamp value associated with a next content segment within a media stream may be identified. The media stream may be one of a plurality of media streams received and output by a central device 105. The time stamp value associated with the next content segment may be identified, for example, by a packet timing module 235 of FIG. 2. In embodiments, the packet timing module 235 may retrieve the time stamp value from the next content segment as the segment is received by the central device 105, as the segment is stored or buffered at the central device 105, as the segment is decoded by the central device 105, or at some other time after the segment is received by the central device 105. For example, the time stamp value may be a PTS (presentation time stamp) of an MPEG audio/video packet.

At 410, a target media player associated with the media stream and a current system time value associated with the target media player may be identified. The target media player and the current system time value of the target media player may be identified, for example, by the packet timing module 235. In embodiments, the packet timing module 235 may identify the target media player from address information identifying the target device within the media stream or from a queue within which packets of the media stream are temporarily held for delivery at the central device 105. The packet timing module 235 may retrieve a system time clock (STC) value associated with the target media player from a synchronization message (e.g., PCR (program clock reference)) that is output from the central device 105 to the target media player.

At 415, a determination may be made whether the identified current system time value is less than the identified time stamp value by more than a threshold amount. The determination may be made, for example, by the packet timing module 235. In embodiments, the packet timing module 235 may compare the identified current system time value to the identified time stamp value, and, if the difference between the identified current system time value and the identified time stamp value is greater than a predetermined threshold and the identified current system time value is less than the identified time stamp value, the packet timing module 235 may determine that the target media player does not require an increased packet transmission rate. It will be appreciated by those skilled in the relevant art that the predetermined threshold may be established at a central device 105 as a configuration parameter and may be updated by a user, technician, service/content provider, or other. The predetermined threshold may vary according to bandwidth available to the central device 105, the speed at which the central device 105 is able to transmit packets to one or more client devices 125, the bitrate required by content delivered from the central device 105 to a client device 125, and others.

If, at 415, the determination is made that the identified current system time value is not less than the identified time stamp value by more than a threshold amount, the process 400 may proceed to 420. At 420, the determination may be made whether the identified current system time value is greater than the identified time stamp value.

If, at 420, the determination is made that the identified current system time value is not greater than the identified time stamp value, the process 400 may proceed to 425. At 425, transmission of packets of the media stream may be prioritized. Packet transmission for the media stream may be prioritized, for example, by the packet prioritization module 210. In embodiments, the packet prioritization module 210 may prioritize packet transmissions for a media stream by regulating the rate and/or order at which the packets are transmitted relative to packets of other media streams. For example, when the packet prioritization module 210 determines that the media stream is to be prioritized over the one or more other media streams, the packet prioritization module 210 can schedule the output of packets such that the packets of the media stream are favored over the packets of the one or more other media streams. The packet prioritization module 210 may deviate from a default scheme for moving packets of multiple media streams (e.g., packets within multiple queues designated for multiple media players or client devices 125) by placing the identified content segment into a position within an output queue (e.g., wireless A/V queue 240 of FIG. 2) for immediate transmission to the associated target media player. For example, rather than filling the wireless A/V queue 240 with packets of multiple media streams according to a default scheme (e.g., such as an even distribution), the identified media stream may be prioritized by placing the identified content segment into the wireless A/V queue 240 ahead of a content segment (i.e., packet) from another media stream that would have been placed into the queue ahead of the identified content segment if the default packet transmission scheme (e.g., round robin scheme) had been used.

If, at 420, the determination is made that the identified current system time value is greater than the identified time stamp value, the process 400 may proceed to 430. At 430, the identified next content segment may be discarded. The next content segment may be discarded, for example, by the packet prioritization module 210. In embodiments, when the packet prioritization module 210 determines that the identified current system time value is greater than the identified time stamp value, the packet prioritization module 210 may determine that a time for playback of the content segment (i.e., packet) associated with the time stamp value has already passed, and the packet prioritization module 210 may discard the content segment without placing the segment in an output queue (e.g., wireless A/V queue 240).

At 435, a time stamp value associated with a next content segment within a next media stream may be identified. The next media stream may be another one of the plurality of media streams received and output by the central device 105. The time stamp value associated with the next content segment may be identified, for example, by a packet timing module 235 of FIG. 2. In embodiments, the packet timing module 235 may retrieve the time stamp value from the next content segment as the segment is received by the central device 105, as the segment is stored or buffered at the central device 105, as the segment is decoded by the central device 105, or at some other time after the segment is received by the central device 105. For example, the time stamp value may be a PTS (presentation time stamp) of an MPEG audio/video packet. After the time stamp value associated with the next content segment within the next media stream, the process may return to 410 where a target media player associated with the next media stream and a current system time value associated with the target media player are identified.

Returning to 415, if the determination is made that the identified current system time value is less than the identified time stamp value by more than a threshold amount, the process 400 may proceed to 440. At 440, a previously utilized or a default packet transmission scheme may be used for transmitting packets of the media stream to the target media player. The default packet transmission scheme may be used, for example, by the packet prioritization module 210 of FIG. 2. In embodiments, the default packet transmission scheme may be an even distribution (e.g., round-robin) of packets from each of a plurality of media streams received at the central device 105 into a buffer for transmission to one or more client devices 125. It should be understood that the default packet transmission scheme may vary according to one or more configuration settings at the central device 105 and that the transmission scheme may not be an even distribution of packets into a buffer. For example, the central device 105 may be configured with default priority settings that require that a certain client device 125 receive packet transmissions at a higher rate than other client devices 125.

Figure 5:
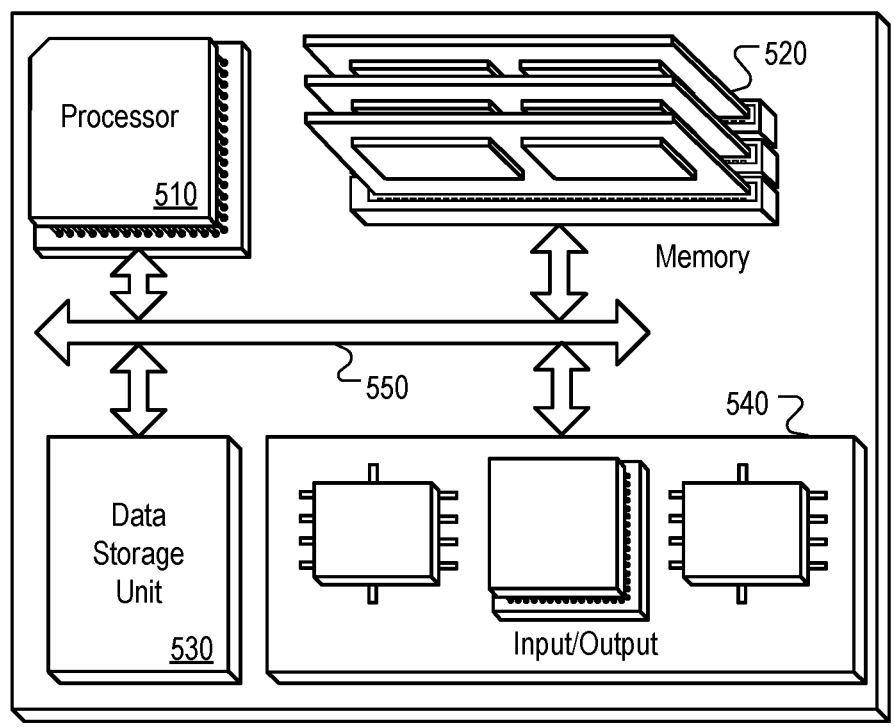
FIG. 5 is a block diagram of a hardware configuration operable to facilitate dynamic packet prioritization for delivery of multiple media streams based upon packet time stamp information.

FIG. 5 is a block diagram of a hardware configuration 500 operable to facilitate dynamic packet prioritization for delivery of multiple media streams based upon packet time stamp information. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 125 of FIG. 1 (e.g., STB, television, computer, tablet, mobile device, etc.). In embodiments, the input/output device can include driver devices configured to send communications to, and receive communications from one or more networks (e.g., local network 120 of FIG. 1, subscriber network 115 of FIG. 1, WAN 110 of FIG. 1, etc.).

Those skilled in the art will appreciate that the invention improves upon methods and systems for prioritizing packet delivery. Methods, systems, and computer readable media can be operable to facilitate dynamic packet prioritization for delivery of multiple media streams based upon packet time stamp information. A central device may retrieve time stamp information associated with one or more packets of a media stream and system time clock information associated with a client device to which output of the media stream is targeted. The central device may compare the time stamp information to the system time clock information, and if the difference between the time stamp information and the system time clock information is less than a predetermined threshold, the central device may deviate from a default packet transmission scheme and may prioritize the delivery of packets from the media stream to the targeted client device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
retrieving a time stamp value associated with a content segment of a media stream, wherein the media stream comprises one media stream of a plurality of media streams that are to be output from a central device to one or more media players, and wherein the time stamp value comprises a presentation time stamp or decode time stamp;
identifying a target media player associated with the media stream which is associated with the retrieved time stamp value;
retrieving a current system time value associated with the target media player;
comparing the retrieved time stamp value to the identified current system time value; and
if the retrieved time stamp value is greater than the identified current system time value by less than a predetermined threshold, prioritizing the delivery of the content segment to the associated media player over the delivery of one or more content segments associated with the one or more other media streams of the plurality of media streams.

2. The method of claim 1, further comprising:
if the identified current system time value is less than the retrieved time stamp value by more than the predetermined threshold, delivering content segments of the plurality of media streams to the one or more media players using a default transmission scheduling scheme.

3. The method of claim 1, further comprising:
if the retrieved time stamp value is less than the identified current system time value, discarding the content segment without outputting the content segment to the target media player.

4. The method of claim 1, wherein prioritizing the delivery of the content segment to the associated media player over the delivery of one or more content segments associated with the one or more other media streams of the plurality of media streams comprises deviating from a default transmission scheduling scheme by placing the content segment into an output queue ahead of the one or more content segments associated with the one or more other media streams.

5. The method of claim 1, wherein prioritizing the delivery of the content segment to the associated media player over the delivery of one or more content segments associated with the one or more other media streams of the plurality of media streams comprises outputting the content segment and one or more other content segments associated with the media stream at a higher rate than the rate at which the one or more content segments associated with the one or more other media streams are output.

6. The method of claim 1, wherein the current system time value comprises a system time clock value and is retrieved by the central device from a program clock reference packet.

7. The method of claim 1, wherein the time stamp value comprises a presentation time stamp value.

8. An apparatus comprising:
a wireless interface configured to be used to output one or more content segments to one or more media players;
a packet timing module configured to:
retrieve a time stamp value associated with a content segment of a media stream, wherein the media stream comprises one media stream of a plurality of media streams that are to be output from the wireless interface to one or more media players, and wherein the time stamp value comprises a presentation time stamp or decode time stamp;
identify a target media player associated with the media stream which is associated with the retrieved time stamp value;
retrieve a current system time value associated with the target media player; and
compare the retrieved time stamp value to the identified current system time value; and
a packet prioritization module configured to prioritize the delivery of the content segment to the associated media player over the delivery of one or more content segments associated with the one or more other media streams of the plurality of media streams if the retrieved time stamp value is greater than the identified current system time value by less than a predetermined threshold.

9. The apparatus of claim 8, wherein the packet prioritization module is configured to deliver content segments of the plurality of media streams to the one or more media players using a default transmission scheduling scheme if the identified current system time value is less than the retrieved time stamp value by more than the predetermined threshold.

10. The apparatus of claim 8, wherein the packet prioritization module is configured to discard the content segment without outputting the content segment to the target media player if the retrieved time stamp value is less than the identified current system time value.

11. The apparatus of claim 8, wherein prioritizing the delivery of the content segment to the associated media player over the delivery of one or more content segments associated with the one or more other media streams of the plurality of media streams comprises deviating from a default transmission scheduling scheme by placing the content segment into an output queue ahead of the one or more content segments associated with the one or more other media streams.

12. The apparatus of claim 8, wherein the current system time value comprises a system time clock value and is retrieved from a program clock reference packet.

13. The apparatus of claim 8, wherein the time stamp value comprises a presentation time stamp value.

14. One or more non-transitory computer readable media having instructions operable to cause one or more processors to perform the operations comprising:
retrieving a time stamp value associated with a content segment of a media stream, wherein the media stream comprises one media stream of a plurality of media streams that are to be output from a central device to one or more media players, and wherein the time stamp value comprises a presentation time stamp or decode time stamp;

identifying a target media player associated with the media stream which is associated with the retrieved time stamp value;

retrieving a current system time value associated with the target media player;

comparing the retrieved time stamp value to the identified current system time value; and if the retrieved time stamp value is greater than the identified current system time value by less than a predetermined threshold, prioritizing the delivery of the content segment to the associated media player over the delivery of one or more content segments associated with the one or more other media streams of the plurality of media streams.

15. The one or more non-transitory computer-readable media of claim 14, wherein the instructions are further operable to cause one or more processors to perform the operations comprising:

if the identified current system time value is less than the retrieved time stamp value by more than the predetermined threshold, delivering content segments of the plurality of media streams to the one or more media players using a default transmission scheduling scheme.

16. The one or more non-transitory computer-readable media of claim 14, wherein the instructions are further operable to cause one or more processors to perform the operations comprising:

if the retrieved time stamp value is less than the identified current system time value, discarding the content segment without outputting the content segment to the target media player.

17. The one or more non-transitory computer-readable media of claim 14, wherein prioritizing the delivery of the content segment to the associated media player over the delivery of one or more content segments associated with the one or more other media streams of the plurality of media streams comprises deviating from a default transmission scheduling scheme by placing the content segment into an output queue ahead of the one or more content segments associated with the one or more other media streams.

18. The one or more non-transitory computer-readable media of claim 14, wherein prioritizing the delivery of the content segment to the associated media player over the delivery of one or more content segments associated with the one or more other media streams of the plurality of media streams comprises outputting the content segment and one or more other content segments associated with the media stream at a higher rate than the rate at which the one or more content segments associated with the one or more other media streams are output.

19. The one or more non-transitory computer-readable media of claim 14, wherein the current system time value comprises a system time clock value and is retrieved by the central device from a program clock reference packet.

20. The one or more non-transitory computer-readable media of claim 14, wherein the time stamp value comprises a presentation time stamp value.

* * * * *